Dec. 22, 1964 KAICHI NISHIMOTO 3,162,248
MOLD BOARD TYPE PLOUGH
Filed April 23, 1963 2 Sheets-Sheet 1
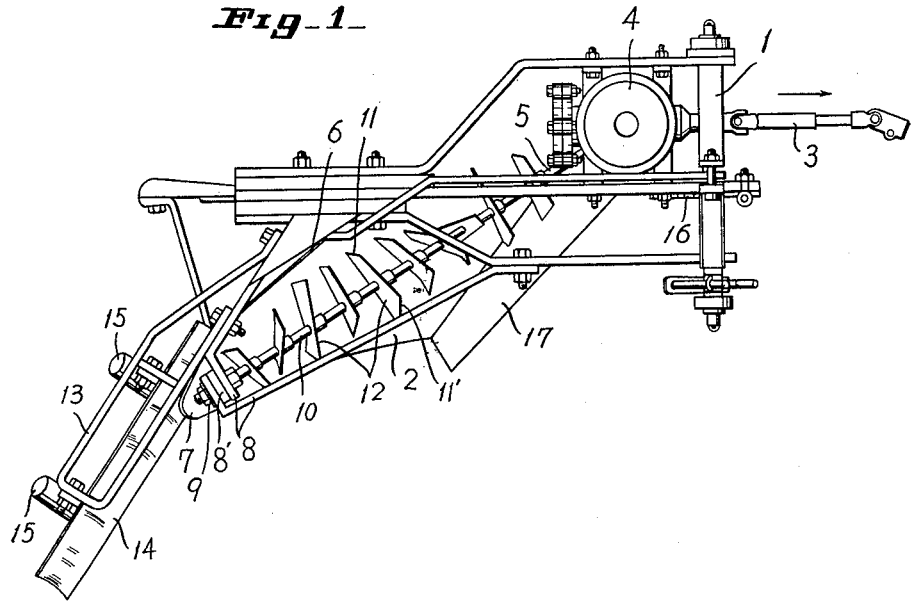
Fig-1-
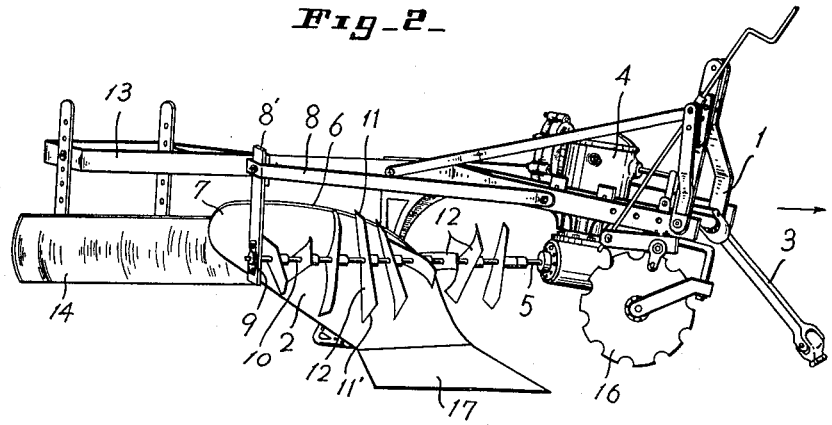
Fig-2-
INVENTOR
Kaichi Nishimoto
BY Stevens, Davis, Miller & Mosher
ATTORNEYS Dec. 22, 1964  KAICHI NISHIMOTO  3,162,248
MOLD BOARD TYPE PLOUGH
Filed April 23, 1963  2 Sheets-Sheet 2
Fig-3-
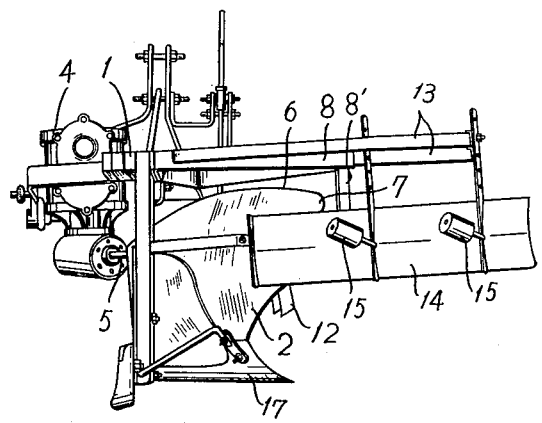
Fig-4-
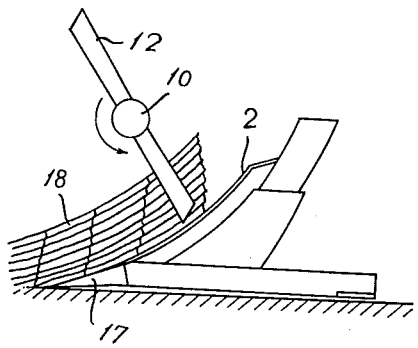
INVENTOR
*Kaichi Nishimoto*
BY *Stevens, Davis, Miller & Mosher*
ATTORNEYS

United States Patent Office 3,162,248
Patented Dec. 22, 1964

3,162,248
MOLD BOARD TYPE PLOUGH
Kaichi Nishimoto, Sapporo, Japan, assignor to Hokunoki Company Limited, Sapporo, Japan, a corporation of Japan
Filed Apr. 23, 1963, Ser. No. 275,109
Claims priority, application Japan, Apr. 28, 1962, 37/17,246; Oct. 31, 1962, 37/49,095
1 Claim. (Cl. 172—66)

The present invention relates to a mold board type plough.

The principal object of the invention is to provide a mold board type plough so constructed and arranged that various cultivating operations such as cutting, raising, turning up, crushing, delivering and leveling of the soil can be carried out by one step, and that the ground is immediately made ready for planting seeds.

A feature of the invention lies in a plough which comprises a mold board, and a rotary soil crushing shaft having a number of cultivating blades arranged along thereon and adapted to be rotated by the rotating power derived from a power supply source of a tractor etc., said rotary soil crushing shaft being journalled in bearings adjacent to and along the front curved surface of said mold board with a narrow gap formed between the ends of said cultivating blades and the front curved surface of said mold board.

For a better understanding of the invention, reference is taken to the accompanying drawings, in which, FIG. 1 is a plan view showing a plough equipped with a mold board according to the invention;

FIG. 2 is its side elevation;

FIG. 3 is a rear view thereof; and

FIG. 4 is a side view explanatory of a crushing action of a mold board according to the invention and low operates cultivating blades.

Referring to the drawings, 1 designates a supporting frame adapted to be detachably connected to a three points supporting device secured to the back of a tractor for use in agriculture. A mold board 2 is secured to the lower and rear part of the frame 1. The frame 1 is provided with a flexible universal joint shaft 3 displaceable in inclined positions and adapted to be connected to a power shaft of the tractor. A gear box 4 is mounted on the frame 1 and encloses therein a gear mechanism for changing the direction and speed of the power transmission. The position of the gear box 4 may be made adjustable both in vertical and horizontal directions. A rotary soil crushing shaft 10 constructed as will be described hereinafter is journalled in bearings formed at one hand by a transmission shaft 5 projected from the lower part of the gear box 4 and at another hand by a bearing 9 provided at the lower part of a supporting rod 8'. The supporting rod 8' is suspended vertically from a supporting rod 8 horizontally extending along the upper edge 6 of the mold board 2 between the rear part of the frame 1 and the rear edge 7 of the mold board 2.

In accordance with the invention, the rotary soil crushing shaft 10 is journalled in bearings and extends horizontally along the front curved surface of the mold board 2 such that a narrow gap is formed between the sharp edge 11 of the cultivating blades 12 and the curved surface of the mold board 2. Moreover, several cultivating blades 12 are secured to the rotary soil crushing shaft 10 and arranged along the shaft 10 with suitable intervals. The blades 12 are provided at the ends thereof with sharp edges 11, 11' slightly inclined rearwards. The blades 12 are secured at the center thereof to the rotary soil crushing shaft 10 by means of screws with suitable intervals such that an envelope formed by the sharp edges thereof traces a spirally curved path.

Moreover, in accordance with the present invention, a suitable supporting rod 13 is connected to the supporting rod 8 and a leveling plate 14 is detachably and adjustably mounted on the supporting rod 13. The leveling plate 14 is suspended at the back of the rear edge 7 of the mold board 2 and slightly inclined rearwards. This leveler 14 abuts the mold board 2 when soil is not being forced against it. Weights 15 are provided at the rear side of the leveling plate 14 for the purpose of preventing the plate 14 from becoming pushed upwards by the thrust force of the soil acting upon it. 16 shows a rolling colter arranged, at the front lower part of the frame 1 and adapted to smoothly carry out the soil raising movement of the mold board 2. 18 designates the soil raised.

In accordance with the invention, the frame 1 is mounted on the three points supporting device provided at the rear part of the tractor.

The mold board 2 is drawn forwards by the tractor to effect various actions upon the soil such as cutting, raising, turning up, crushing, delivering and leveling etc. by a single step of the plough.

That is, the power derived from the power shaft of the tractor is converted through the universal coupling shaft 3 into a vertically acting power and then converted through the gear box 4 into a horizontally acting power, thereby rotating the rotary soil crushing shaft 10 at a high speed faster than the speed of the tractor in a direction shown by an arrow in FIG. 4. As shown in FIG. 4, the sharp edge 17 of the mold board 2 serves to cut the soil and raise it by its wedge action, and the soil 18 thus raised is caused to be shifted along the curved surface of the mold board 2, which results in a displacement of each inner layer of the soil raised. The raised soil 18 is thus turned up, whilst at the same time the soil is subjected to the crushing action of the cultivating blades 12 rotating at a high speed. Then, the crushed soil is sprially transferred to the rear part of the mold board 2 in succession owing to forward movement of the mold board 2 and the spiral arrangement of the cultivating blades 12 until the soil arrives at the rear edge 7 of the mold board 2 from where the soil is turned up and delivered away.

Further, in accordance with the invention the crushed soil delivered out of the rear edge 7 of the mold board 2 is subjected to the leveling action of the leveling plate 14 moving forwards together with the mold board 2.

The frame 1 for supporting the mold board 2 is not limited to that shown in the drawing and described above. The frame 1 shown in FIG. 1 may be used to support the gear box 4 by the aid of any suitable fittings in a simple manner. The rotary soil crushing shaft 10 may be moved horizontally in transverse direction by means of the gear box 4 adapted to be connected to the universal coupling shaft 3, thereby constituting a power transmission mechanism in an extremely simple manner. The rotary soil crushing shaft 10 is journalled in bearings horizontally along the front intermediate curved surface of the mold board 2, with the result that the raised soil 18 can be subjected to the rotary action in rearward and inclined directions such that the soil is raised, turned up and crushed in a smooth manner.

As above described, the present invention has remarkable advantages that the cultivating blades 12 having the sharp edges 11, 11' slightly inclined rearwards are spirally arranged on the rotary soil crushing shaft 10, so that as the plough moves forwards the crushed soil is spirally transferred rearwards and the raised soil 18 is removed from the mold board 2 to considerably relieve the resistance of the soil acting against the drawing force, and that the cultivating blades 12 act instantaneously on the raised soil 18 while it is cut and raised along the curved surface of the mold board to crush and pulverize the crushed soil into minute particles.

In accordance with the invention, the sharp edges 11 of the cultivating blades 12 are arranged adjacent to the front intermediate curved surface of the mold board 2, so that the cultivating blades 12 when rotated play a role of scraping intermittently the curved surface of the mold board 2, with the result that the curved surface of the mold board 2 is prevented from becoming adhered to the soil, which has usually occurred on the conventional mold board type plough. Thus, the plough according to the invention can be applied to cultivate various kinds of the soil.

If it is necessary to adjust the position of the rotary soil crushing shaft 10 in up and down and to and fro directions for the purpose of effecting a deep cultivation, the gear box 4 and the supporting bar 8' may be so constructed that they can be reciprocable in up and down and to and fro directions. Any conventional or suitable construction for this purpose are available and consequently the adjusting means are not shown in the figures.

Moreover, the leveling plate 14 is so mounted as to be slightly inclined backwards from the rear edge of the mold board 2, so that the soil crushed and delivered from the mold board 2 can immediately be subjected to the leveling action of the leveling plate 14. In this case, thrust force of the crushed soil acting backwards against the leveling plate 14 is compensated by the weights 15 secured to the back side of the leveling plate 14.

The plough constructed as above mentioned permits not only of raising and turning up the soil as in the conventional mold board type plough, but also of crushing the soil with one step and further of preventing the mold board from being adhered with the soil without necessitating any modifications on the curvature of the mold board in dependence with the kinds of the soil to be cultivated.

The plough according to the invention makes it possible to form the mold board into a single and integral body, with the result that the plough can be manufactured in mass production in a simple manner, and also to effect the leveling of the ground by means of the leveling plate mounted at the back of the mold board, thereby shortening the time necessary for cultivating and leveling the soil.

Though the invention is described by means of an embodiment as shown in the drawing, yet various modifications can of course be made without departing from the scope of the claim.

What I claim is:

A plough adapted to be drawn in a forward direction comprising a supporting frame adapted to be detachably connected to a tractor, a mold board dependingly secured to said frame, said mold board comprising an arcuately-shaped face extending from a lower forward position to an upper rearward position and angularly disposed with respect to the forward direction, a ground cutting blade affixed to the bottom of said face, a longitudinal crushing shaft disposed in substantially a horizontal plane and extending parallel to at least one chord in said arcuate face, a plurality of cultivating blades spaced longitudinally from each other and mounted on said crushing shaft, said blades having at least one face which is inclined rearwardly for forcing the cultivated soil upwardly and rearwardly when said blades are rotated, said blades having at least one sharp edge adapted to contact the soil being cultivated, each of said plurality of blades being angularly positioned with respect to adjacent blades so that the ends of said blades lie in a spiral envelope, said crushing shaft rotatably supported by said frame and said blades being positioned such that the tips of said blades when rotated come in close proximity to said arcuate face, and driving means for rotating said crushing shaft to cause said blades to rotate in an upward direction when said blades are contiguous to said arcuate face, and a leveling plate dependingly secured to mounting means on said frame, said plate being adjacent to and rearward of the upper rearmost portion of said mold board, and said mounting means enabling said plate to move away from said mold board in opposition to a bias.

References Cited by the Examiner

UNITED STATES PATENTS

| | | | |
|---|---|---|---|
| 466,771 | 1/92 | Clark | 172—548 X |
| 567,475 | 9/96 | Hindermeier | 172—66 |
| 1,173,822 | 2/16 | Lyons | 172—66 |
| 1,273,829 | 7/18 | Davidson | 172—66 |
| 1,691,352 | 11/28 | Hicks | 172—66 |
| 1,706,573 | 3/29 | Hicks | 172—66 |
| 2,242,479 | 5/41 | Panengen | 172—66 |
| 2,244,538 | 6/41 | Kasten | 172—67 |
| 2,342,031 | 2/44 | Bagan | 172—72 |
| 2,670,670 | 3/54 | Allison | 172—66 |

FOREIGN PATENTS 517,768  3/55  Italy.

ABRAHAM G. STONE, *Primary Examiner.*